United States Patent [19]

Oi et al.

[11] 4,174,163

[45] Nov. 13, 1979

[54] FILM UNIT PROCESSING MEANS

[76] Inventors: Nakao Oi, 8-32, Naka-machi 1-chome, Odawara-shi, Kanagawa-ken; Tadayoshi Shibata, Fuji Shashin Fuirumu Apato No. 10 A-218, 482-1, Nakanuma, Minami-ashigara-shi, Kanagawa-ken; Toshio Goto, 1-41, Kishiki-cho, Omiya-shi, Saitama-ken, all of Japan

[21] Appl. No.: 891,680

[22] Filed: Mar. 30, 1978

Related U.S. Application Data

[63] Continuation-in-part of Ser. No. 666,370, Mar. 12, 1976, abandoned, and a continuation-in-part of Ser. No. 621,332, Oct. 10, 1975, abandoned.

[30] Foreign Application Priority Data

Oct. 12, 1974 [JP] Japan ............................ 49/117588

[51] Int. Cl.² ............................................. G03B 17/50
[52] U.S. Cl. ........................................ 354/86; 354/304
[58] Field of Search ........................ 354/86, 85, 304; 222/102; 100/176, 158 R

[56] References Cited

U.S. PATENT DOCUMENTS

| | | | |
|---|---|---|---|
| 2,762,295 | 9/1956 | Varga et al. | 100/158 R |
| 3,240,148 | 3/1966 | Varga | 100/158 R |
| 3,693,521 | 9/1972 | Harvey et al. | 354/86 |
| 3,925,800 | 12/1975 | Whall | 354/86 X |

*Primary Examiner*—R. L. Moses
*Attorney, Agent, or Firm*—Sughrue, Rothwell, Mion, Zinn and Macpeak

[57] ABSTRACT

A film unit processing means in an auto-process camera, comprising first and second processing rolls or bars, and a frame to support said rolls or bars. In supporting said rolls, bars, or a combination, one above the other by the frame to define a passage therebetween for movement of the film unit therethrough, they are relatively inclined to cross at their centers at a predetermined angle to the plane perpendicular to the plane of advance of the film unit to provide an optimum pressure to process the film unit.

11 Claims, 14 Drawing Figures

FILM UNIT PROCESSING MEANS

This application is a continuation-in-part application of application Ser. No. 666,370 filed Mar. 12, 1976 now abandoned as a continuation-in-part application of application Ser. No. 621,332 filed Oct. 10, 1975 now abandoned.

BACKGROUND OF THE INVENTION

1. Field of the Invention

The present invention relates to an auto-process camera, and more particularly, to a means for processing film units in an auto-process camera.

2. Description of the Prior Art

There is known a photographic process, which is frequently referred to as auto-process, and according to which, a film is provided in the form of individual units including a layer of photosensitive image-recording material supported on one of a pair of sheets and also including at least one breakable pod containing a processing solution, more particularly, for example, one type of the film unit comprises at least a negative image layer exposable to produce a negative or latent image of an object and a positive image layer on which a positive, viewable image corresponding to the image produced on the negative image layer may be formed under the influence of a developing and processing solution which is diffused through the film unit, it being also possible for film units to contain other layers, depending on film unit type and purpose. It is usual practice to provide processing solution in breakable pods which are embedded in the film unit structure near one end portion thereof, and to provide, in an associated camera, pressure means, which is suitably constituted by a pair of rolls, for breaking open the pods. After being loaded into a camera and exposed, a film unit is moved, with the film unit end containing the processing solution pods foremost, and brought into engagement with and drawn through the pressure rolls, which break and open the pods and cause extrusion of the processing solution and diffusion thereof through the film unit, the film unit being brought immediately afterwards to the exterior of the camera, there thus being made available a viewable print a very short time after exposure of the film unit, without making it necessary for a photographer to proceed to a separate, specially equipped location for development and processing of film. The film unit may be drawn through the processing rolls either by means of a leader, which is constituted by a strip of paper or similar material, and is attached at one end to the film unit and may be pulled manually, or by means of actuation of one or both the processing rolls by mechanical or electrical drive means provided in the associated camera. In the latter case, means are provided in the camera to forward the exposed film unit from an exposure station to, and into engagement with the processing rolls, and the processing rolls also act to forward the film unit out of the camera, which offers the advantage, for the photographer, of ease of manipulation. In either case, it is essential that the pressure exerted by the processing rolls be sufficient to ensure efficient spreading of processing solution through the film unit, but at the same time the processing solution must be distributed therethrough uniformly. The thickness of the distributed processing solution over the entire length and width of the film unit not only directly influences the quality of a photographic print of the subject image, but also is an important factor for the determination of the amount of processing solution contained in the pods provided in the film unit in the manufacturing thereof. For example, in the diffusion transfer photography, the quality of the photographic print of the subject image is directly related to the thickness distribution of the processing solution between the negative image layer and the positive image layer and variations in average thickness of the same therebetween decisively affect the balance of the color and the contrast of the image of the final photographic print.

Furthermore, in cases where opaque liquids are employed as the processing solution for shielding the negative image layer from light, such irregular distribution of the processing solution through the film unit may transmit light irrelevant to the exposure of the subject image, thus giving rise to blur or uneven shade of color in the final print.

Conventionally, the film unit processing means of the above described type, for example, one incorporated in the so-called "auto-process" camera based on the diffusion transfer photography includes a pair of rolls disposed in parallel relation to each other, with a predetermined space kept therebetween, or a roll having a corresponding rigid member spaced a predetermined distance from the former, or a pair of rigid members disposed in parallel to each other so as to squeeze the pod therebetween and to cause the pod provided in the leading edge of the film unit to rupture for spreading the solution contained therein in the form of a layer within the film unit as the same unit passes therethrough.

The conventional arrangement as described above in which pressing members such as rolls or rigid members are disposed in pairs in parallel to each other with a predetermined distance therebetween, however, has such a disadvantage that uniform thickness distribution troughout the film unit is difficult to achieve due to slight elastic deformation of the pressure members, construction of the film unit and viscosity of the developing solution or the like. In order to overcome such a disadvantage, there is conventionally proposed a processing means as shown in FIG. 1, wherein a crown roll 1 having a diameter gradually increasing toward the central portion thereof is provided in parallel with an ordinary roll 2 having the same diameter over the entire length thereof, which the crown roll, however, requires an extremely high accuracy in the axial diameter variation thereof, resulting in difficulties and consequent high cost in manufacturing.

Accordingly, an essential object of the present invention is to provide a film processing means for use in an auto-process camera in which thickness distribution and average thickness of the processing solution to be spread within a film unit can be controlled as desired with substantial elimination of disadvantages inherent in the conventional processing means.

Another important object of the present invention is to provide a film processing means of the above described type which is accurate and stable in functioning.

A further object of the present invention is to provide a film processing means of the above described type which is simple in construction and can be manufactured at low cost for incorporation into an auto-process camera.

SUMMARY OF THE INVENTION

According to the present invention, the film unit comprises an upper processing roll, and a lower processing roll which are rotatably supported in pairs by a support frame secured to a camera body. The upper and lower rolls extend between the side plates which extend upwardly at right angles from opposite ends of the support frame in such a manner that a suitable gap is provided between the opposed rolls to form a passage for a film unit to pass therethrough, while each of said rolls whose axis is adapted to be in parallel with the surface of the film unit to be inserted is slightly inclined, about its center point, to make a predetermined angle with respect to an imaginary line coinciding with the direction of advance of the film unit, thus said two rolls crossing over each other at the central point thereof as viewed from the top, by which arrangement, the gap or space between the two rolls is minimized at the central portions of said two rolls, with the gap gradually increasing toward opposite ends of said crossed rolls, thus making it possible for the film unit passing between said two rolls to be pressed such that processing solution is spread evenly between the sheets.

In the above arrangement of the invention, it is necessary to determine the variation of the gap between the rolls such that the thickness distribution of the spread processing solution is uniform in a direction of width of the film unit, and the degree of variation of said gap is substantially determined by the amount of crossing of the two rolls, i.e., the distance between the lines of projection of the axis of the two rolls at opposite ends thereof, or an angle made by the crossing axes of the same. Similarly, the average thickness of the processing solution spread within the film unit inevitably affected by the presence of frame members, i.e., outer spacers or inner spacers provided adjacent to opposite edges of the film unit for holding a plurality of sheets composing the same film unit is also substantially determined by the relative height or gap between rolls and the crossing angle of said two rolls.

Furthermore, in the film unit processing means of the invention, the pair of rolls or pressure members set in position with a predetermined gap and crossing angle are constantly urged by suitable urging means for maintaining relative position thereof so as to prevent excessive load from being applied to said rolls. Additionally, in the processing means of the invention, the pressure members are not limited to the pair of rolls, but a pair of rigid members or straight bar members having corresponding convex projections thereon and fixedly supported by side plate members, or a combination of a cylindrical roll and a fixed rigid member such as a half bar having a corresponding convex contact projection thereon may be employed for this purpose, while the diffusion transfer processing liquid or the opaque liquid for light shielding, or the combination of the both may be employed for the processing solution to be spread, in the latter case of which the film unit may be provided with separate pods for containing therein the two kinds of liquids.

Moreover, depending on the construction of the processing means, spring means for urging the rolls toward each other may not necessarily be employed so far as the objects of the invention are achieved.

These and other objects and features of the present invention will become apparent from the following description taken in conjunction with a preferred embodiment thereof with reference to the accompanying drawings.

BRIEF DESCRIPTION OF THE DRAWINGS

Before the description of the present invention proceeds, it is to be noted that like parts are designated by like reference numerals throughout several views of the accompanying drawings.

It should also be noted that because photographic film unit and cameras related to the present invention are well known, the description hereinbelow will be directed in particular to elements forming a part of, or cooperating directly with the present invention. Film unit and camera elements not specifically shown or described herein may be selected from those known in the art.

DESCRIPTION OF THE PREFERRED EMBODIMENTS

Figure 1:
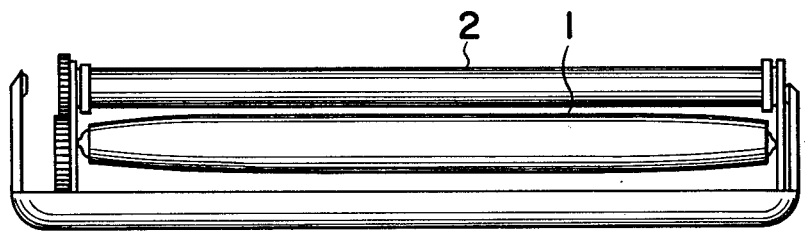
FIG. 1 is a front view of a film unit processing means according to the prior art.
Figure 2:
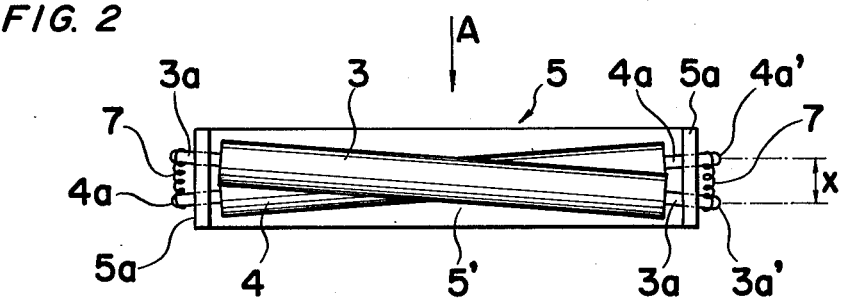
FIG. 2 is a top plan view of a film unit processing means according to the present invention.
Figure 3A:
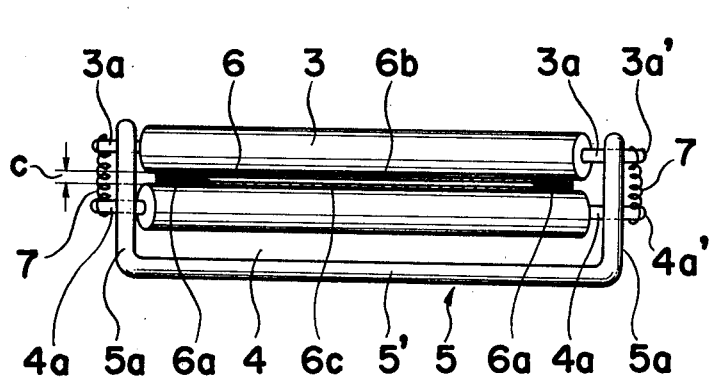
FIGS. 3(a) and 3(b) are front and side elevational views, respectively, of the film unit processing means of FIG. 2 with a film unit held therebetween.
Figure 3B:
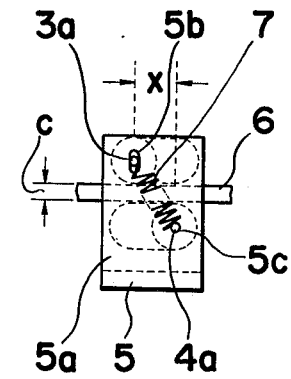
Figure 4:
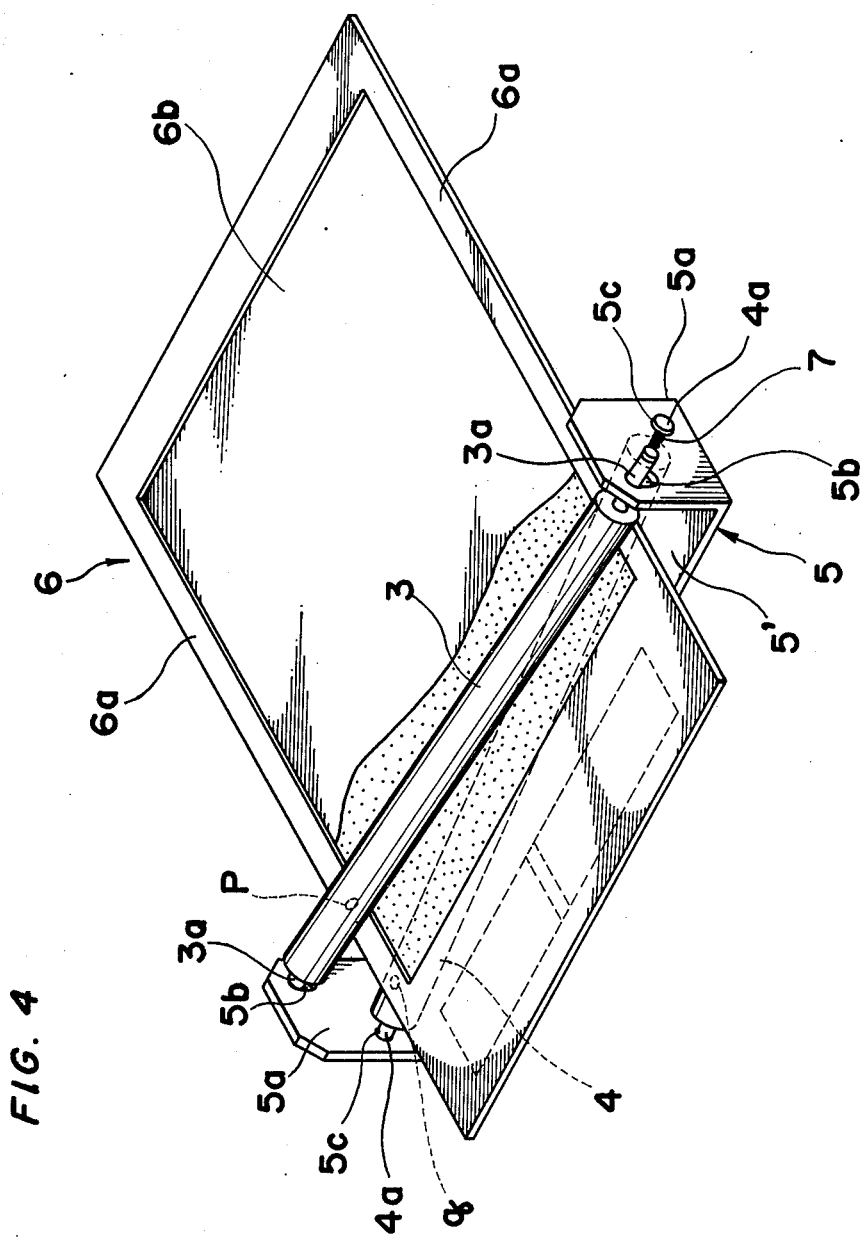
FIG. 4 is a perspective view, on an enlarged scale, of the film unit processing means of FIG. 2, with a film unit inserted therebetween.

Referring to FIGS. 2 to 4, there is shown a film unit processing means for the invention which generally comprises a base plate 5' of a comparatively narrow rectangular configuration which is somewhat longer in width than the width of a film unit to be processed, side plate or supporting elements 5a extending upwardly at right angles from opposite ends of the base plate 5' to form a frame 5 of a substantially U-shaped cross section, and an upper processing roll 3 and a lower processing roll 4 which are rotatably supported by the side plates 5a at reduced diameter portions or axial projections 3a and 4a formed in the opposite ends of the rolls 3 and 4, respectively in such a manner that a suitable gap is provided between the rolls 3 and 4 to form a passage for a film unit 6 to pass therethrough, while each of said rolls 3 and 4 whose axis is in parallel with the surface of the base plate 5b and the surface of the film unit 6 to be inserted therebetween is slightly inclined about its longitudinal center point, to make a predetermined angle with respect to an imaginary plane perpendicular to the plane of movement of the film unit 6, thus said two rolls 3 and 4 crossing over each other at their centers, as viewed from the top (FIG. 2).

The base plate 5 is fixedly provided in the body of the camera by means of securing screws, or welding, or some other known securing means.

It should be noted here that the film unit processing means described above is situated in a camera in a position intermediate between an exposure station whereat successive film units loaded in the camera are correctly held in position for exposure and an exit through which successive exposed film units are moved to the exterior of the camera. Upon exposure of each of successive film units, it is moved by known means (not shown) which are not part of this invention, to the processing means, which catches the forward edge of the film unit between the two rolls 3 and 4, so that the exposed film unit can be processed and have the processing solution squeezed out of the pod and spread between the negative image layer 6b and the positive image layer 6c of the film unit after each shutter release to produce a viewable photographic print.

More specifically, each of the rolls 3 and 4 is cylindrical having the same diameter over the entire length thereof, with the axial projections 3a and 4a integrally formed at its opposite ends, while in each of the side plates 5a of the support frame 5, there is formed an approximately vertically extending elongated opening 5b for receiving therein the axial projection 3a of the upper roll 3, while a circular opening 5c is formed below and adjacent to the opening 5b for receiving therein the axial projection 4a of the lower roll 4. On the portions of the axial projections 3a and 4a extending through the side plates 5a concaved portion or annular grooves are preferably provided to engage ends of the coil springs 7 for urging the rolls 3 towards the roll 4.

The length of the rolls 3 and 4 are slightly longer than the width of the film unit to permit the film unit to pass therethrough.

As is clearly seen form FIG. 4, elongated openings 5b permit upward and downward movement of the upper roll 3 with respect to the lower roll 4, whereas the openings 5c are perfectly circular and of slightly larger size than projections 4a to hold the lower roll 4 in its position, the coil springs 7 stretched between the ends of the projections 3a and 4a which extend through the side plates 5a, urging the upper roll 3 toward the lower roll 4. It should be noted that, in the above arrangement, a minimum clearance determined by the relative positions of the openings 5b and 5c is kept between the rolls 3 and 4, which clearance is increased upon insertion of the film unit as the upper roll 3 is raised against the urging force of the spring 7. It should also be noted that even when the upper roll is raised by the film unit, the springs 7 are strong enough to force the roll 3 downwardly to break the pods and to distribute the processing solution uniformly between a negative layer 6b and a positive layer 6c of the film unit 6.

Still referring to FIGS. 2 to 4, a crossing amount X, i.e., the distance between a line extending upwardly at right angles from the axis of the roll 3 and one extending upwardly at right angles from the axis of the roll 4 at the corresponding extreme ends of the rolls 3 and 4, and a space or clearance C, i.e., the distance between the corresponding surfaces of the rolls 3 and 4 at the crossing point thereof, are to be decided by the thickness of the opposite side edges of the film unit 6 including the spacers 6a and the thickness of the processing solution to be distributed between the negative image layer 6b and the positive image layer 6c of the film unit 6.

Figure 5:
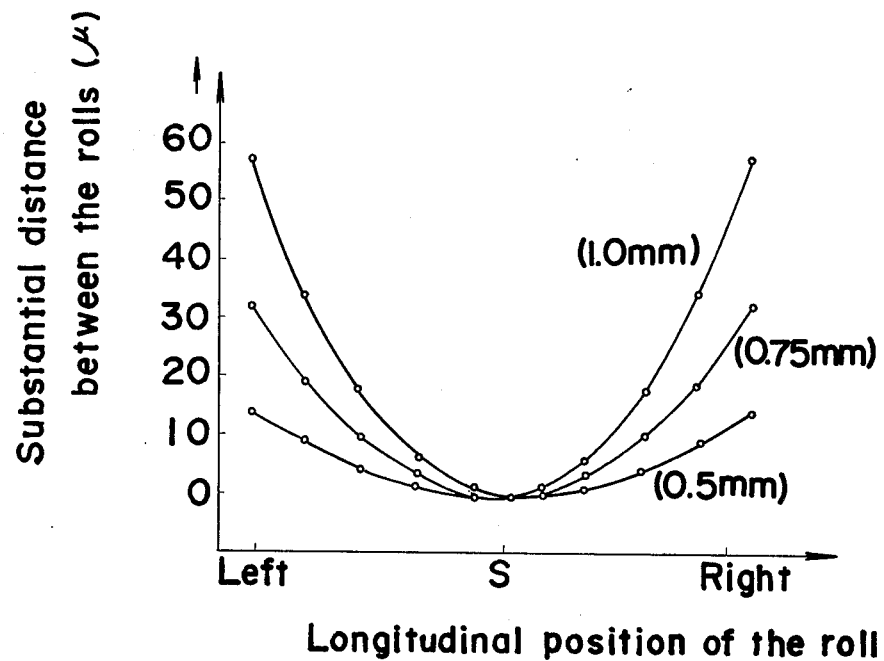
FIG. 5 is a graph showing relation of an amount of crossing to substantial distance between a pair of processing rolls.

Referring to FIGS. 4 to 7, when the cylindrical rolls 3 and 4 are disposed to cross over each other as described above at a crossing point, a substantial distance t between the rolls 3 and 4, i.e., the straight line substantial distance t between corresponding points p and q assumed on the rolls 3 and 4 shown by the dotted line circles in FIG. 5, at which points p and q the rolls 3 and 4 contact the surfaces of the film unit 6 on the imaginary lines parallel to the direction of advancement of the same film unit 6, varies along the axis of the rolls 3 and 4 according to the variations of the crossing amount X.

For example, when the rolls 3 and 4 each having a diameter of 8 mm. are crossed over the crossing points, with the spring 7 being subjected to a load of 2 kg., the substantial distance t increases parabolically from the crossing points towards left and right extreme ends 3a' and 4a' of the axial projections 3a and 4a of the rolls 3 and 4, while the rate of increase of the distance t further increases as the crossing amount increases, for example, in the order of 0.5 mm., 0.75 mm. and 1.0 mm. as shown in FIG. 5.

It should be noted that the substantial distance t at the crossing point S is assumed to be zero in the graph of FIG. 5.

Figure 6:
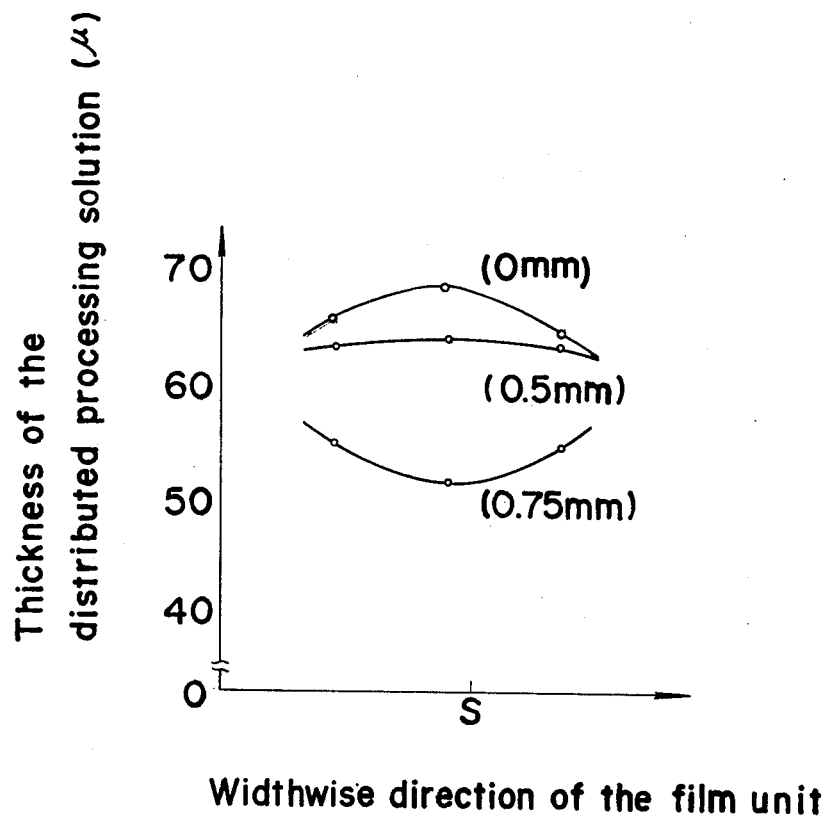
FIG. 6 is a graph showing relation of the amount of crossing of the processing rolls to widthwise thickness distribution of processing solution.

As is seen from the above description, the substantial distance t which varies with the crossing amount X as a parameter directly affects the widthwise thickness direction of the processing solution spread within the film unit 6, and as shown in FIG. 6, when the crossing amount X is assumed to be zero, that is, when the axes of the rolls 3 and 4 are parallel to each other, the thickness of the processing solution spread between the layers 6b and 6c after the film unit 6 moved from between the rolls 3 and 4 will be thicker at the central position of the passage than in the left and right portions adjacent the side edges of the film unit 6. On the contrary, when the crossing amount X is set at 0.75 mm., the thickness of the processing solution after the film unit moved from therebetween will be thinner at the central portion S than at the left and right portions adjacent to the side edges of the film unit 6.

The present invention confirmed through a series of experiments that if the crossing amount X is set at 0.5 mm. in this case, approximately uniform thickness distribution of the processing solution is available both at the center point S and the left and right portions adjacent to side edges of the film unit 6.

The crossed rolls 3 and 4 in this embodiment, and the corresponding elements in the other embodiments create particularly due to the fact that the film unit 6 includes spacer 6a disposed along the side edges of that unit, a minimum clearance at the center of the rolls where they are crossed over with each other. Accordingly, immediately after the film unit moved between the rollers, the processing solution is spread to a greater amount at the portions adjacent the opposed spacer 6a, while a lesser amount is spread at the center portion. After the film unit moves beyond the rollers and just after being released from the pressure, on one hand, the processing solution flows towards the center portion to spread evenly between the layers, and on the other hand, the layers 6b and 6c of the film unit which have been pressed towards each other under relatively high pressure to narrow the space therebetween return to positions where the thickness of the unit measured between the layers 6b and 6c is approximately equal to the thickness of the spacer 6a. As a consequence, the space between the layers 6b and 6c especially at the center portion is widened.

Figure 7:
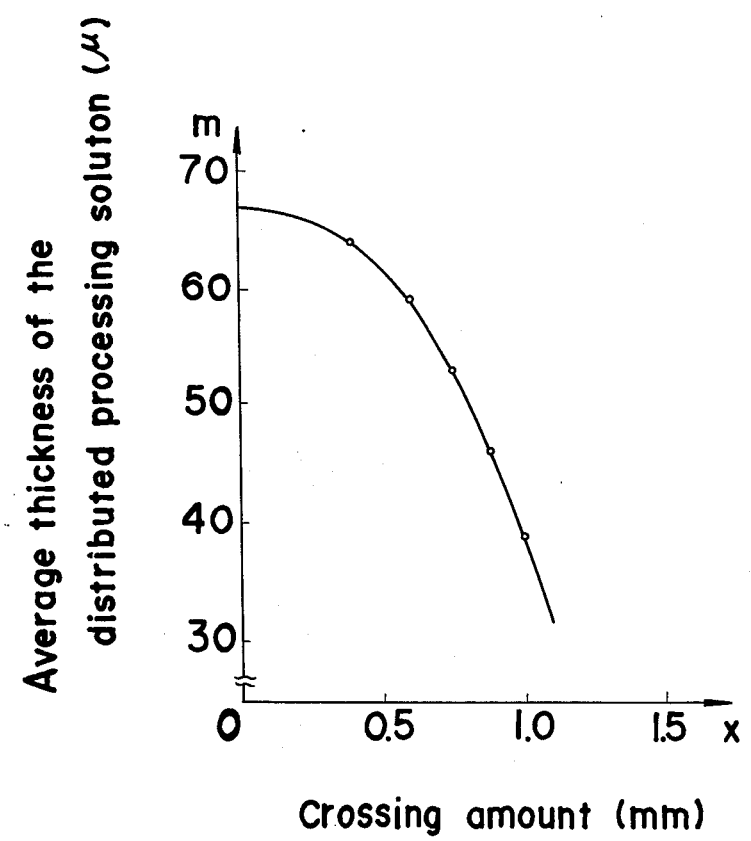
FIG. 7 is a graph showing relation of the amount of crossing of the processing rolls to average widthwise thickness of the spread solution.

As shown in FIG. 7, the average thickness m, i.e., the average of the thickness of the distributed processing solution through the direction of the passage between the rolls 3 and 4, parabolically decreases in accordance with the increase of the crossing amount X, provided that the space C and the thickness of the spacers 6a are constant, which is considered to be due to the fact that the spacers 6a disposed along the side edges of the film unit 6 for combining the sheets 6b and 6c, are largely distorted or deformed from opposite directions by the rolls 3 and 4 which are spaced considerably a great distance apart from each other at their ends, the deformation or distortion acting to cause the thickness of the processing solution to decrease at the side edges of the film unit 6.

The average thickness m which naturally varies in accordance with the thickness of the spacers 6a holding the negative image layers 6b and the positive image layer 6c, at the side edges of the film unit 6, can also be controlled by the crossing amount X, as described above, and if the desired thickness necessary for the processing solution to be spread is known, the crossing amount X and the clearance C between the rolls 3 and 4 can be decided on the basis of the value of the desired thickness.

It is to be noted that the rolls 3 and 4 described as both inclined at the predetermined angle relative to the plane perpendicular to the plane of movement of the film unit 6 may not be both inclined, but either one of the rolls 3 and 4 may be disposed parallel to the plane perpendicular to the plane of movement of the film unit 6 with the other roll is inclined in the above described manner.

Furthermore, at least one of the rolls 3 and 4 can be rotatably driven by a motor provided in a camera through a preferred transmitting system as in conventional camera to proceed the distribution of the processing solution by the rolls.

It is needless to say that the spring means described as employed in the above embodiment for urging the upper roll toward the lower roll may be dispensed with, in which case the elongated openings supporting the upper roll may be replaced by a pair of circular openings of a size closely receiving the projections for supporting the corresponding ends of the upper roll in position.

As is clear from the foregoing description, according to the film processing means of the invention, since the substantial distance t between the upper and lower rolls 3 and 4 is maintained at a preferred extent through the passage therebetween, which provides optimum pressure to every portion through the passage to distribute the processing solution evenly between the negative image layer and the positive image layer of the film unit during the processing of the film unit, with the rolls 3 and 4 crossing over each other at a predetermined angle relative to each other, no twisting force is exerted on the film unit, by which arrangement an even distribution of the processing solution between the negative image layer and the positive image layer of the film unit can be ensured.

Furthermore, by setting the space C at a preferred distance, an optimum average thickness of the processing solution between the negative image layer and the positive image layer can be achieved so that the required amount of the processing solution can be maintained therebetween.

Figure 8A:
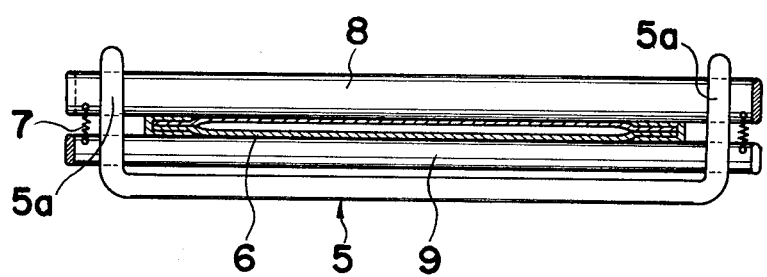
FIGS. 8(a) and 8(b) are front and side elevational view of another embodiment of the film unit processing means of the present invention with the film unit held thereby.
Figure 8B:
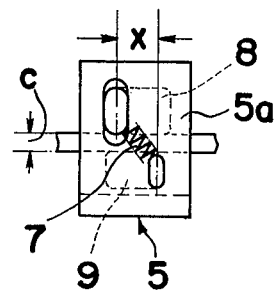

By reference to FIGS. 8(a) and 8(b), a modified embodiment of the invention employs a support frame 5 of generally U-shaped configuration having integral side plates 5a at each end in similar fashion to the embodiment of FIGS. 3(a) and 3(b). Suitable slots are provided within the side plates 5a for receiving the projecting ends of upper and lower bars 8 and 9, respectively, the bars being essentially rectangular in cross section but curved at their upper and lower edges such that the curved edges face each other and receive between themselves, a film unit 6 identical to the film unit 6 of FIG. 3. Further, springs 7 joined at their ends to the bars 8 and 9 bias the bars towards each other and in like fashion to the embodiment of FIGS. 3(a) and 3(b), the bars 8 and 9 cross over each other. In this respect, either bar 8 or bar 9 may extend at right angles to the direction of movement of the film unit 6 through the processing means with the other bar inclined relative thereto, or both are inclined relative to a plane at right angles to the direction of movement and longitudinal axis of the film unit 6. In this embodiment, the bar members 8 and 9 constitute straight bars, neither of which rotate, but which move relatively toward and away from each other within slots formed within the side plates 5a.

Figure 9A:
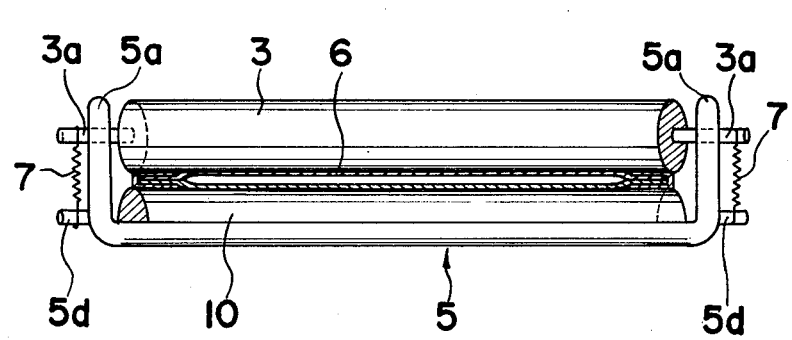
FIGS. 9(a) and 9(b) are similar views to FIGS. 8(a) and 8(b), but particularly show another embodiment of a film unit processing means in accordance with the present invention.
Figure 9B:
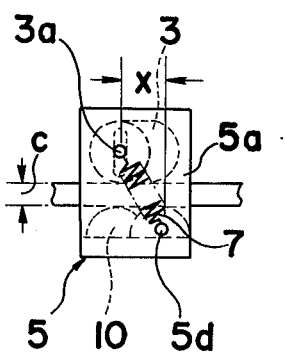

Turning next to the embodiment of FIGS. 9(a) and 9(b), this embodiment of the invention employs an identical support frame 5 of U-shaped conficuration including laterally spaced side plates 5a having elongated slots therein which receive respectively, projections 3a in the form of reduced diameter portions of a roll 3. Roll 3 is thus mounted for rotation about its axis by way of the projections 3a and is spring biased towards the underlying semi-cylindrical bar 10 whose convex surface faces the periphery of the roll 3 and between the same is sandwiched the film unit 6 which passes therebetween. Fixed pins 5d mounted to the side plates 5a have fixed thereto one end of the biasing springs 7, the other ends of which are fixed to the projections 3a and effect the bias causing the roll 3 to press the film unit 6 against the semi-cylindrical bar 10. Again, the bar 10 may have its axis coincide with a plane perpendicular to the longitudinal axis or direction of movement of the film unit 6 through the processing means, or its axis may be skewed relative to that plane, that is, inclined as is roll 10, whose axis is oppositely inclined. In any case, the axis of roll 3 must be inclined relative to the axis of the semi-cylindrical bar 10 so that the members 3 and 10 are disposed to cross over each other in the manner of the prior embodiments. In this case, the roll 3 rotates about its axis while the semi-cylindrical bar 10 is fixed.

Figure 10A:
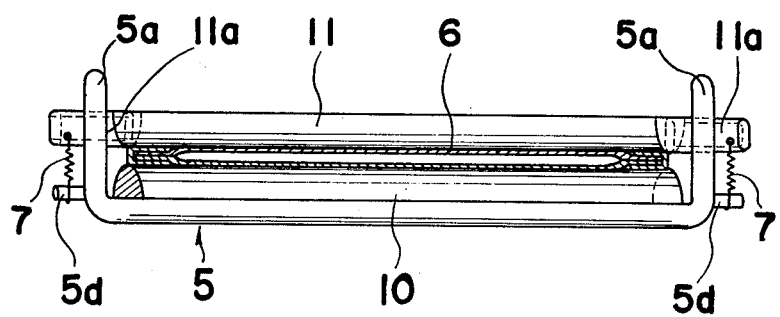
FIGS. 10(a) and 10(b) are similar views to FIGS. 8(a) and 8(b), but particularly show still another embodiment of the film unit processing means of the present invention.
Figure 10B:
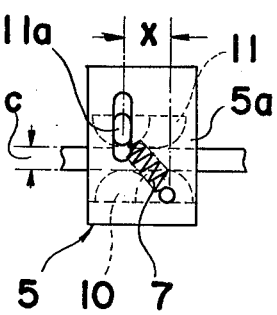

Referring to FIGS. 10(a) and 10(b), another embodiment of the present invention employs an identical support frame 5 having integral side plates 5a, each of which carries an elongated slot running vertically which receives the rectangular shape end portions 11a of a semi-cylindrical bar 11 whose convex outer surface faces the convex outer surface of an underlying, fixed semi-cylindrical bar 10 identical to the bar 10 of the embodiment of FIGS. 9(a) and 9(b). Pins 5d fixed to the side plates 5 fixedly hold one end of the biasing spring 7, the other end of which is mounted to the semi-cylindrical bar projection portions 11a, thus the film unit 6 is pressed during its travel by the movable bar 11, biased towards the fixed bar 10, the bars 10 and 11 having their axes inclined relative to each other so that they cross over each other at a crossing point intermediate of their ends in like manner to the prior embodiment. Thus, in all the illustrated embodiments, whether the upper and lower members be rolls or bars or a combination of the same, they are either both inclined at a predetermined angle relative to a plane perpendicular to the plane of movement of the film unit 6 or one of them is so inclined if the other is disposed parallel to that plane which intersects the plane of movement of the film unit 6.

Therefore, according to the present invention, it is not necessary to provide a crown on the processing roll to distribute the processing solution evenly, but cylindrical rolls crossing over each other will serve the purpose which cylindrical rolls can readily be manufactured and the cost for the manufacture can be reduced.

Although the present invention has been fully described by way of example with reference to the accompanying drawings, it is to be noted that various changes and modifications are apparent to those skilled in the art. Therefore, unless such changes and modifications depart from the scope of the present invention, they should be construed as included therein.

What is claimed is:

1. In a photographic apparatus including means for spreading a fluid in a film unit between a pair of sheet elements, spacers interposed between said sheet elements at opposite lateral edges, said spreading means comprising:
    first and second pressure members with axes of the first and second pressure members being positioned in parallel to the surface of the film unit to be passed therebetween, at least one of said pressure members being inclined, at its center, to form a predetermined angle to the plane perpendicular to a direction of advance of the film unit and crossing over the other of said pressure members; and
    means for supporting said first and second pressure members in said predetermined relation to each other,
    whereby, as the film unit moves between the pressure members, the processing solution is initially spread in a greater amount at the portions adjacent said spacers at said lateral edges of said sheet elements than at the center portion thereof and after the film unit moves out from between said first and second pressure members, said processing solution flows towards the center portion of the unit as said pair of sheet elements move away from each other at the center to cause said processing solution to spread evenly between the sheets.

2. The photographic apparatus as claimed in claim 1, wherein said supporting means is formed by a fixed base plate member having width greater than the width of said film unit and having side plate members integrally connected to opposite ends of said base plate member and extending from said base plate member and parallel to each other, whereby said first and second pressure members extend between said side plate members.

3. The photographic apparatus as claimed in claim 2, wherein one of said pressure members is supported by said side plates for movement toward the other pressure member and said processing means further comprising spring means connected between said pressure members for uging said one of said pressure members to said other of said pressure members.

4. The photographic apparatus as claimed in claim 2, wherein said first and second pressure members comprise a pair of cylindrical rolls rotatably supported on said side plate members.

5. The photographic apparatus as claimed in claim 2, wherein one of said first and second pressure members is a cylindrical roll rotatably supported on said side plate members and the other of said pressure members is a bar member fixedly supported by said side plate members and having a projection corresponding, in its width, to the surface of said cylindrical roll, said projection being spaced away from the surface of said cylindrical roll by a predetermined clearance.

6. The photographic apparatus as claimed in claim 2, wherein said first and second pressure members comprise a pair of bar members fixedly supported by said side plate member each having a projection corresponding to the other in width facing each other, with a predetermined minimum clearance therebetween.

7. The photographic apparatus as claimed in claim 2, wherein said film unit processing means further includes pressure member drive means and drive transmission means connecting said drive means to at least one of said pressure members.

8. The photographic apparatus as claimed in claim 2, wherein said first and second pressure members comprise bar members mounted for movement towards and away from each other within vertical slots formed within laterally opposed side plates of a U-shaped support frame.

9. The photographic apparatus as claimed in claim 2, wherein said first and second pressure members comprise semi-cylindrical bar members having convex surfaces facing each other for contact with respective sides of the film unit insertably received therebetween.

10. The photographic apparatus as claimed in claim 3, wherein said first and second pressure members comprise a pair of cylindrical rolls, each of said rolls rotatably supported on said side plate members with a predetermined minimum clearance therebetween.

11. The photographic apparatus as claimed in claim 10, wherein one of said cylindrical rolls is rotatably supported by said side plate members through elongated slots formed in said side plate members so that said one cylindrical roll can be spaced away from the other of said cylindrical rolls against the biasing force of said spring means for permitting the pod of the film unit to be forcibly inserted therebetween.

* * * * *